(12) United States Patent
Kim et al.

(10) Patent No.: US 6,927,833 B2
(45) Date of Patent: Aug. 9, 2005

(54) METHOD FOR FORMING POST SPACERS IN LIQUID CRYSTAL DISPLAY

(75) Inventors: Hyang Yul Kim, Kyoungki-do (KR); Seung Hee Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 129 days.

(21) Appl. No.: 10/325,117

(22) Filed: Dec. 20, 2002

(65) Prior Publication Data

US 2003/0123018 A1 Jul. 3, 2003

(30) Foreign Application Priority Data

Dec. 31, 2001 (KR) .................. 10-2001-0089256

(51) Int. Cl.⁷ ............... G02F 1/1339; G02F 1/1333; G02F 1/13
(52) U.S. Cl. .................. 349/155; 349/110; 349/187
(58) Field of Search ................ 349/155, 110, 349/187

(56) References Cited

U.S. PATENT DOCUMENTS

| | | | |
|---|---|---|---|
| 5,555,103 A | * | 9/1996 | Anderson .............. 358/3.19 |
| 5,720,640 A | | 2/1998 | Lu et al. |
| 5,838,414 A | | 11/1998 | Lee |
| 5,978,061 A | * | 11/1999 | Miyazaki et al. .......... 349/155 |
| 6,061,114 A | | 5/2000 | Callegari et al. |
| 6,067,144 A | * | 5/2000 | Murouchi .............. 349/156 |
| 6,080,528 A | | 6/2000 | Ho et al. |
| 6,208,327 B1 | | 3/2001 | Ho et al. |
| 6,218,082 B1 | * | 4/2001 | Yang .................. 430/325 |
| 6,646,709 B2 | * | 11/2003 | Matsumoto ............ 349/156 |
| 2004/0007752 A1 | * | 1/2004 | Nakata et al. .......... 257/443 |

* cited by examiner

Primary Examiner—Tarifur R. Chowdhury
Assistant Examiner—Hoan Chau Nguyen
(74) Attorney, Agent, or Firm—Ladas & Parry LLP

(57) ABSTRACT

The present invention relates to a method for forming post spacers in a liquid crystal display, which enables cell gap to be uniform by means of a half-tone mask. The method comprises the steps of: defining a active region and a dummy region in a substrate; forming a black matrix on the substrate at the outside of the active region; selectively forming a RGB resin film on the active region while selectively forming a RGB resin film on the dummy region; forming a protective film on the resulting structure; forming a photosensitive resin film on the protective film; forming a half-tone mask pattern on the photosensitive resin film; and selectively etching the photosensitive resin film using the half-tone mask pattern so as to form the post spacers having a different height.

6 Claims, 10 Drawing Sheets

(a) Square Dot type (b) Circle Dot type (c) Horizontal type (d) Vertical type

METHOD FOR FORMING POST SPACERS IN LIQUID CRYSTAL DISPLAY

BACKGROUND OF THE INVENTION

1. Field of the Invention

The present invention relates to a method for forming post spacers in a liquid crystal display, and more particularly to a method for forming post spacers in a liquid crystal display, which enables cell gap to be uniform by means of a half-tone mask.

2. Description of the Prior Art

A liquid crystal display is a device in which a liquid crystal layer consisting of liquid crystal molecules is sandwiched between two substrates each having a transparent electrode formed thereon, and the arrangement of the liquid crystal molecules is changed by an electric field occurring between the transparent electrodes so that the transmission of light is controlled, thereby displaying desired images.

In this liquid crystal display, characteristics including response time, contrast ratio, viewing angle and luminance uniformity are closely connected with the liquid crystal layer thickness (i.e., cell gap), maintaining a uniform cell gap is very critical to improve image quality. In particular, as the liquid crystal display is gradually increased with respect to area and quality, the maintenance of the uniform cell gap is of more importance.

For this reason, in a process for fabricating the current liquid crystal display, for example in an assembling process between two substrates, spacers for maintaining the cell gap is mostly scattered on either of the substrates. In this case, a manner of scattering the spacers includes a dry manner in which the spacers are charged and uniformly scattered by repulsive power between the spacers of the same polarity, and a wet manner in which the spacers are mixed in a solvent such as IPA and scattered.

In a thin film transistor-liquid crystal display (TFT-LCD), the dry manner having a characteristic of excellent scattering uniformity is generally employed.

However, in view of tendency toward larger area and higher quality of the LCD device, the manner of maintaining the cell gap by scattering the conventional spacers has many processing problems.

Namely, in the spacer-scattering manner, uniform scattering of the spacers is difficult, the aggregative phenomenon of the spacers occurs, and the light leakage phenomenon occurs surrounding the spacers, so that it is difficult to uniformly maintain the cell gap. This results in the deterioration of image quality.

Accordingly, in another attempt to maintain the cell gap, there was proposed a method in which post-type spacers are formed on a color filter substrate or a TFT substrate.

FIG. 1 is a schematic view showing a general color filter, FIG. 2 is an enlarged view of the region A of FIG. 1, and FIG. 3 is an enlarged view of the region B of FIG. 2.

As shown in FIGS. 1 to 3, an active region 10 and a dummy region 20 are defined in a color filter substrate 1, after which a black matrix region 11 for blocking light is formed on the substrate 1 at the outside of the active region 10. Color pixels 12a, 12b and 12c are selectively formed on the active region 10, and at the same time, dummy color pixels 12a', 12b' and 12c' are formed in order to stably pattern the color pixels 12a, 12b and 12c and to ensure a process margin, such as rubbing in a cell process. Also, post spacers 13a are uniformly formed in the color filter substrate 1 at a uniform density. At this time, the black matrix is 2 to 5 mm in width, and the dummy color pixels 12a', 12b' and 12c' are formed at intervals of about 0.5 to 3 pixels.

Meanwhile, in order to make a post density uniform on the color filter substrate 1 having the post spacers 12 formed therein, the post spacers 13a are placed on the active region 10 and also on the color pixels 12a, 12b and 12c of the black matrix 11. As a result, a height difference between the post spacers 13a is caused, as shown in FIG. 4.

In FIG. 4, h1 indicates a step height caused by the black matrix 11 of a different width when forming the red pixel 12c and a protective film 14, and is about 0.2 to 0.5 $\mu$m where the resin black matrix 11 is applied. h2 indicates a step height caused by a patterned lower region of a different width when pattering a material for forming the post spacer 13a, and is about 0.1 to 0.4 $\mu$m. h3 indicates an entire step height between the two regions occurring at the end of the process and is about 1 $\mu$m or below.

Namely, the prior method for forming the post spacers in the liquid crystal display as described above has the following problems.

Due to the height difference between the post spacer formed on the active region and the post spacer formed on the outer black matrix, a cell gap difference between the active region and the outer black matrix occur, as shown in FIG. 5, when assembling the color filter substrate 100 and the array substrate 30 together with a sealant. In FIG. 5, d1 is cell gap in the active region, and d2 is a cell gap in an RGB dummy pattern portion of the outer black matrix. Thus, the luminance non-uniformity of the liquid crystal display is caused.

SUMMARY OF THE INVENTION

Accordingly, the present invention has been made to solve the above-mentioned problems occurring in the prior art, and an object of the present invention is to provide a method for forming post spacers in a liquid crystal display, by which uniform cell gap is formed throughout a color filter substrate by means of a half-tone mask, such that the liquid crystal display exhibits a characteristic of uniform luminance.

To achieve the above object, the present invention provides a method for forming post spacers in a liquid crystal display, which comprises the steps of: defining a active region and a dummy region in a substrate; forming a black matrix on the substrate at the outside of the active region; selectively forming a RGB resin film on the active region while selectively forming a RGB resin film on the dummy region; forming a protective film on the resulting structure; forming a photosensitive resin film on the protective film; forming a half-tone mask pattern on the photosensitive resin film; and selectively etching the photosensitive resin film using the half-tone mask pattern so as to form the post spacers having a different height.

In the method of the present invention, the half-tone mask pattern is preferably formed in a square dot shape, a dot shape, a horizontal line shape, or a vertical line shape.

Also, the photosensitive resin film is preferably formed of a polymer substance.

Moreover, the polymer substance is preferably selected from the group consisting of an acrylic polymer, an epoxy-based polymer, an alignment agent, and a photoresist.

Furthermore, a post density in the post spacer region is preferably 1 post spacer/3 pixels.

In addition, the shape of the post spacers is preferably a rectangular shape, such as a 15×20 μm size.

BRIEF DESCRIPTION OF THE DRAWING

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a method for forming post spacers in a liquid crystal display according to the present invention will be described in further detail with reference to the accompanying drawings.

Figure 1:
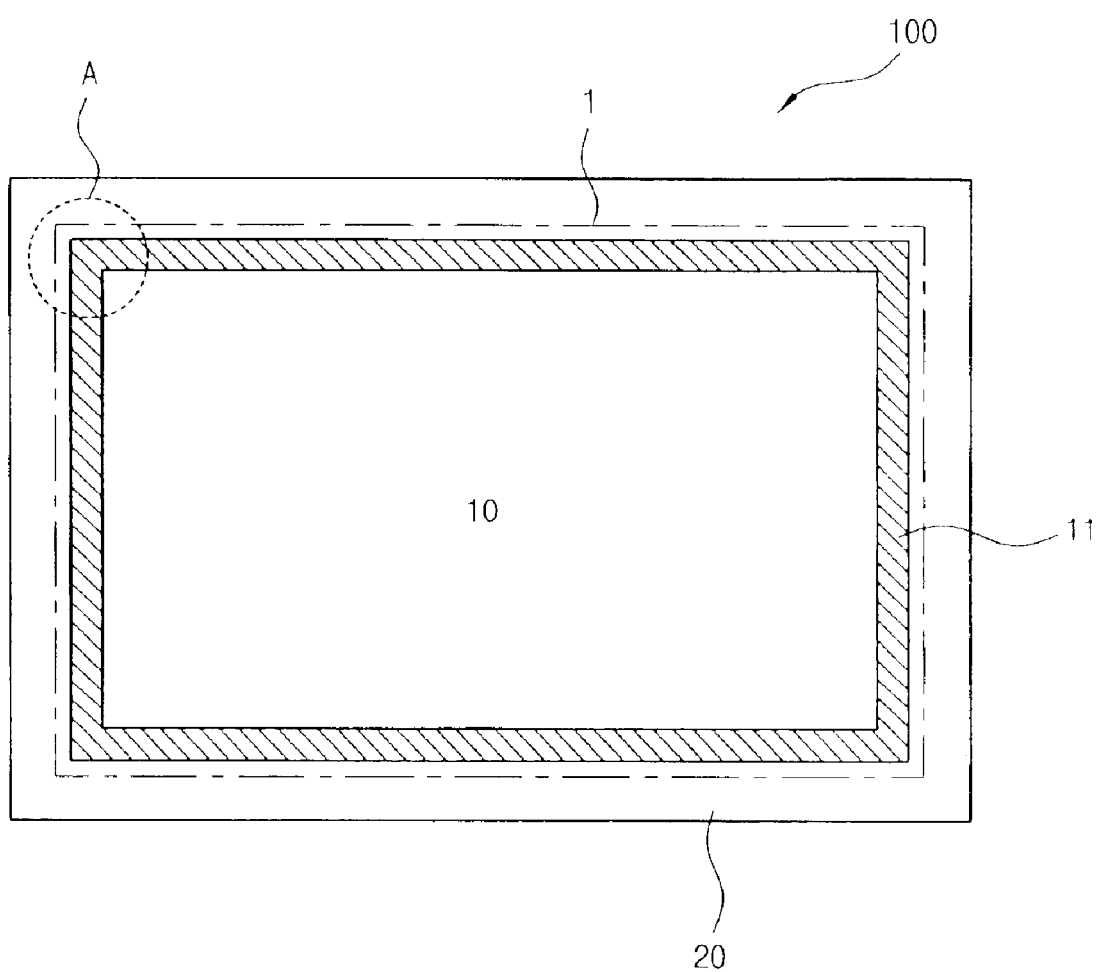
FIG. 1 is a schematic view showing a general color filter.
Figure 2:
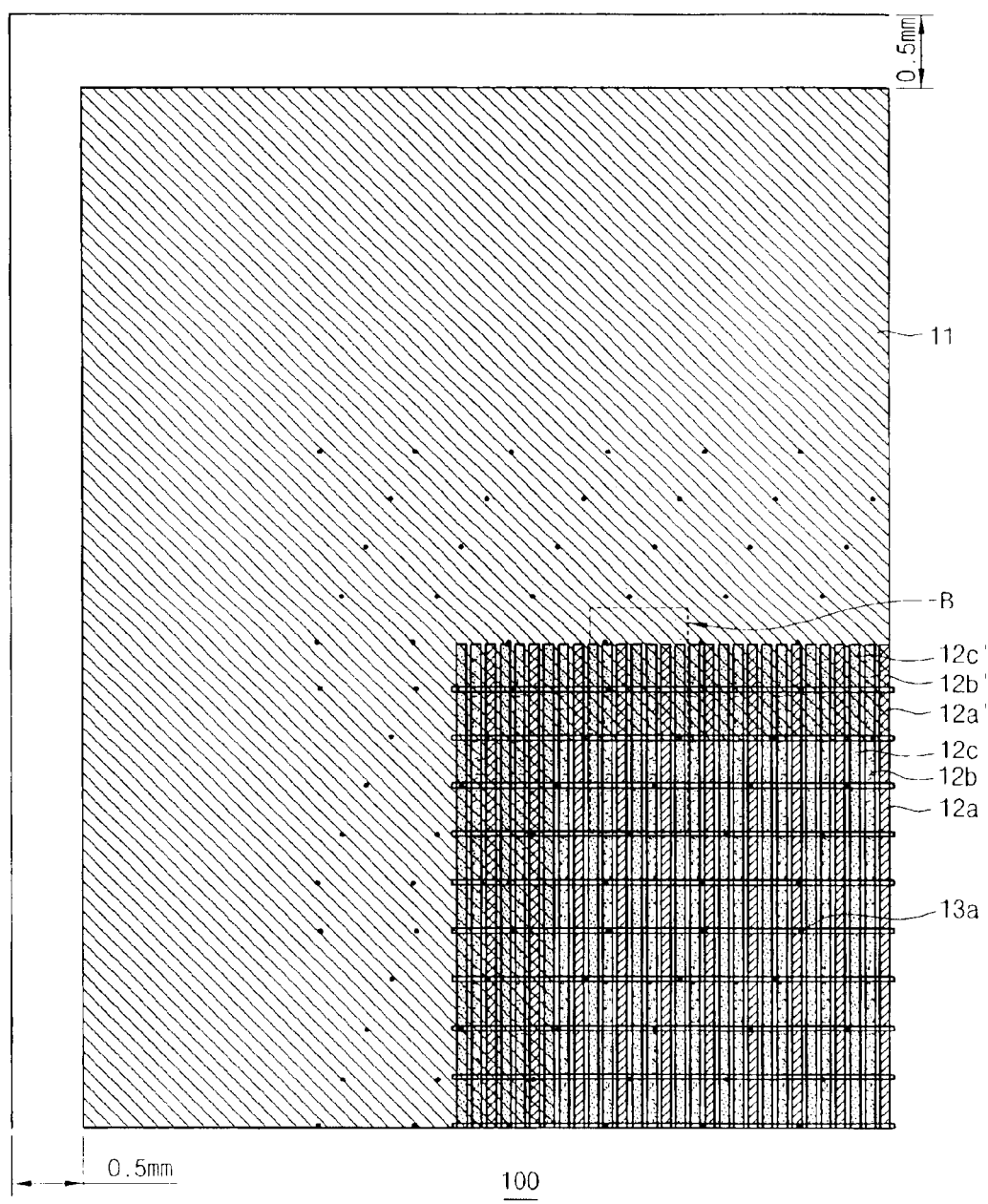
FIG. 2 is an enlarged view of the region A of FIG. 1.
Figure 3:
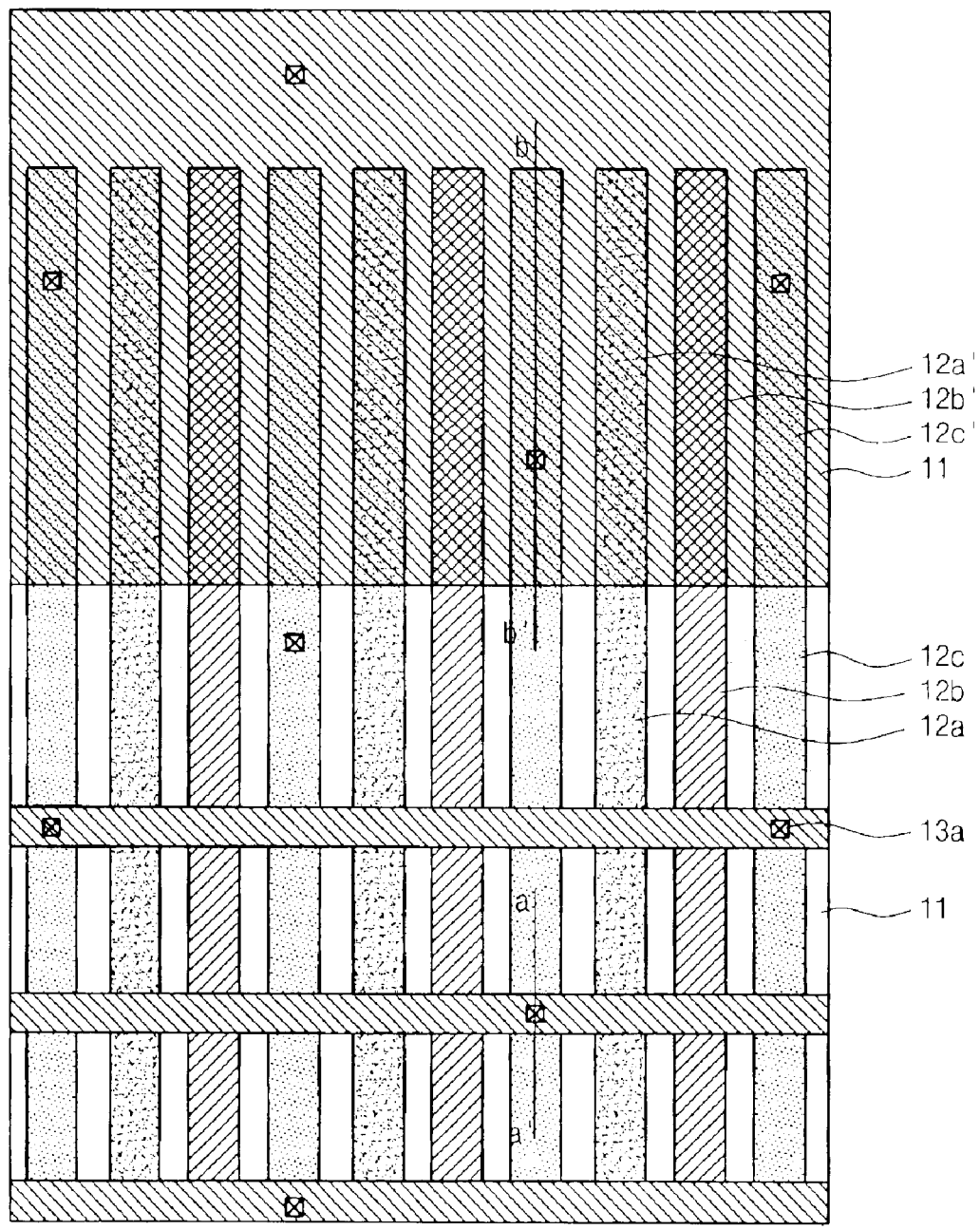
FIG. 3 is an enlarged view of the region B of FIG. 2.
Figure 4:
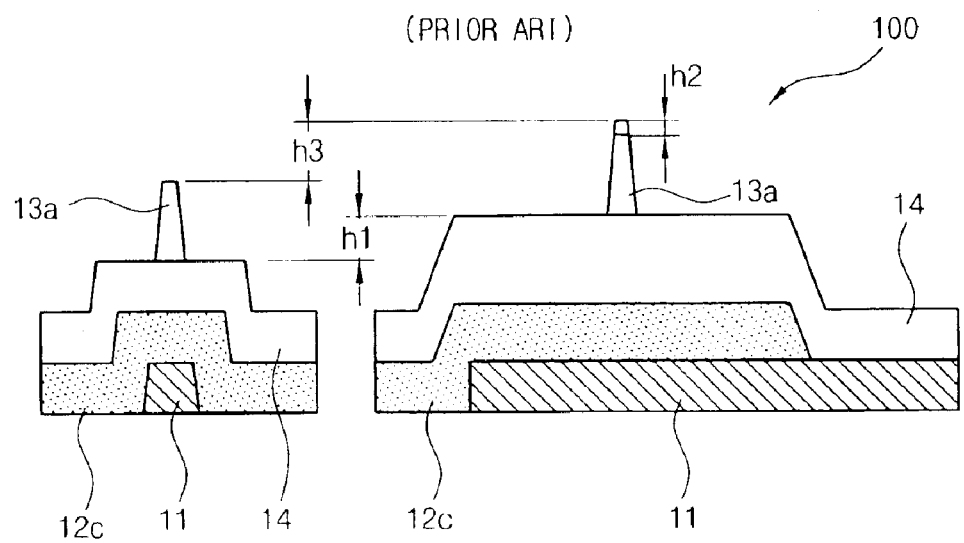
FIG. 4 is a cross-sectional view taken along the lines a—a and b—b of FIG. 3.
Figure 5:
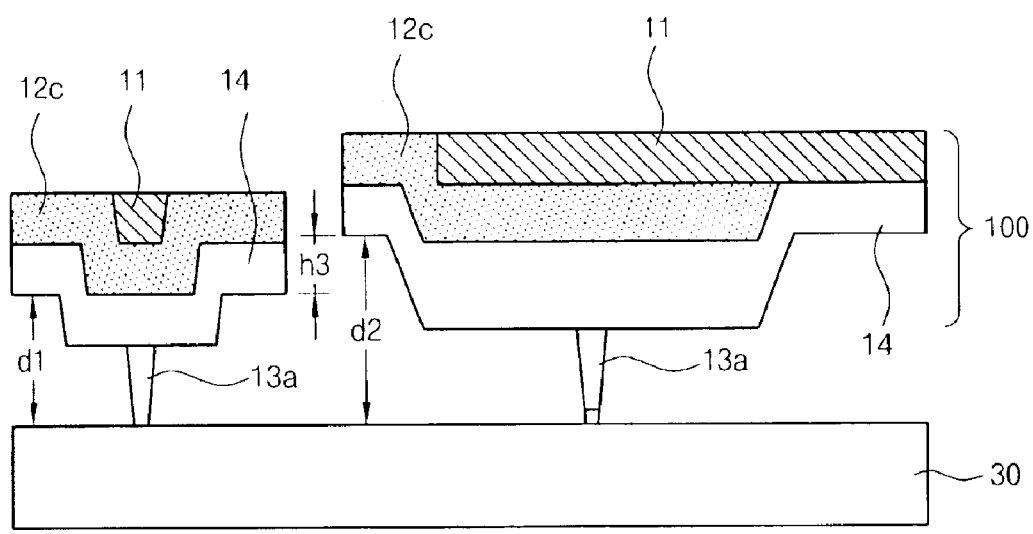
FIG. 5 is a drawing showing uniform cell gap in the prior color filter substrate.
Figure 6:
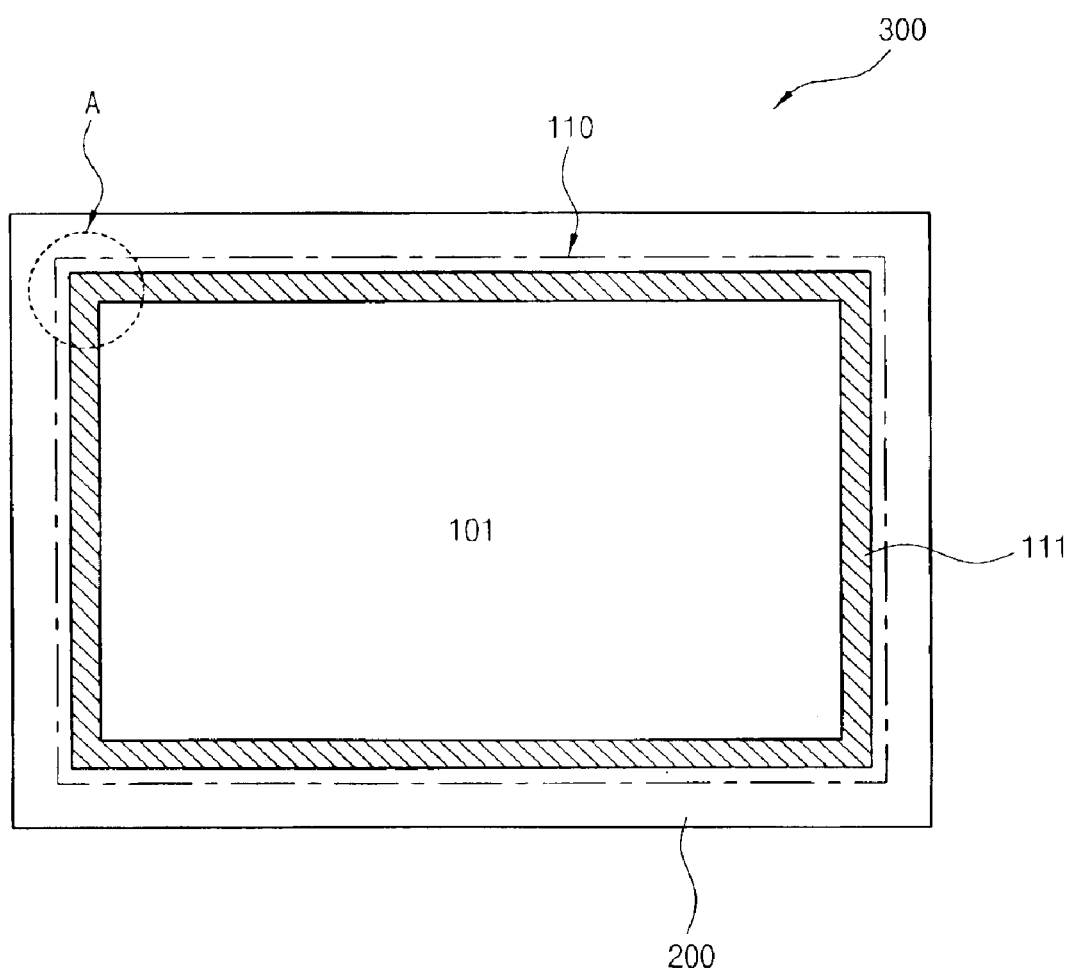
FIG. 6 is a top view showing a color filter substrate according to an embodiment of the present invention.
Figure 7:
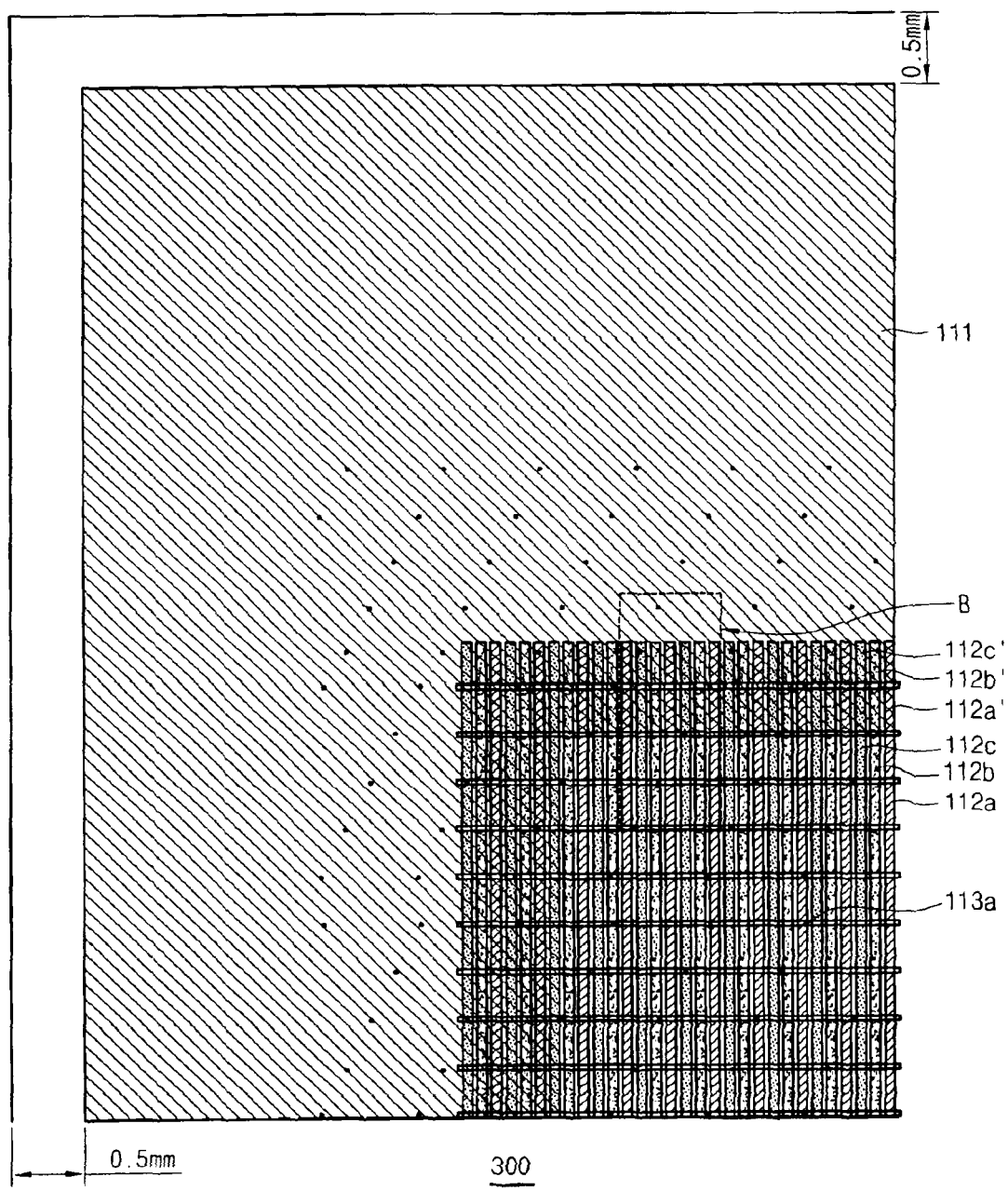
FIG. 7 is an enlarged view of the region A of the FIG. 6.
Figure 8:
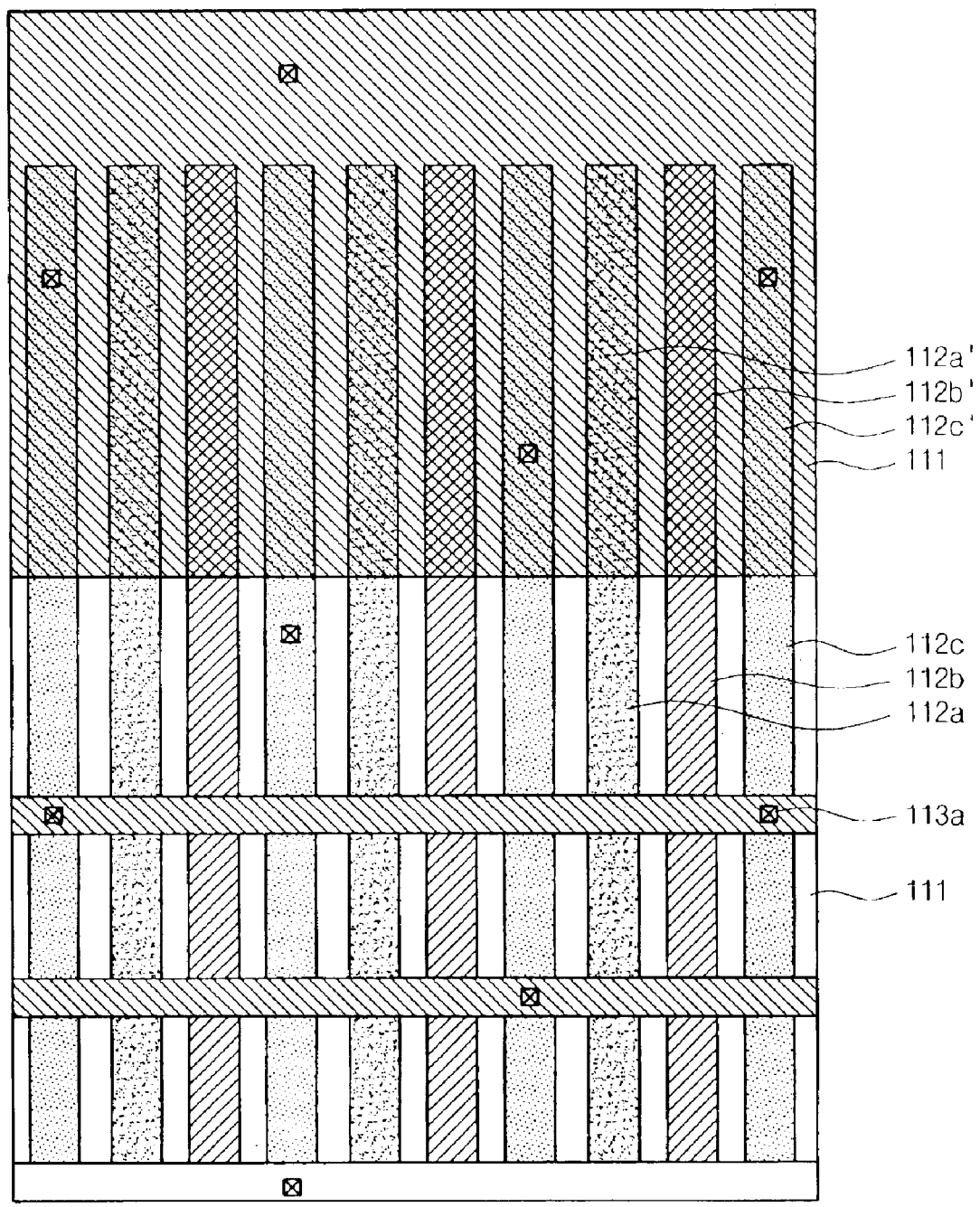
FIG. 8 is an enlarged view of the region B of FIG. 7.
Figure 9:
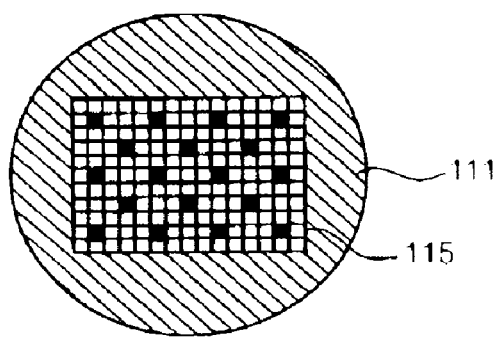
FIG. 9 shows the shape of a half-tone mask pattern according to the present invention.
Figure 9:
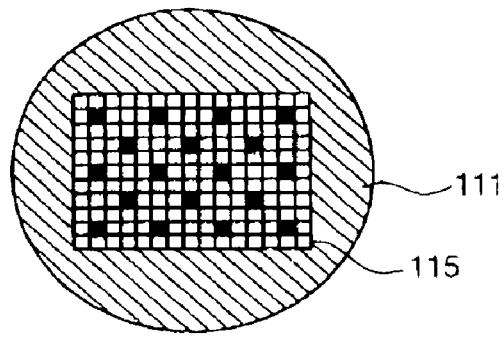
Figure 9:
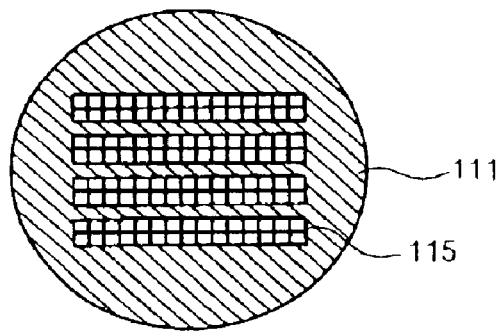
Figure 9:
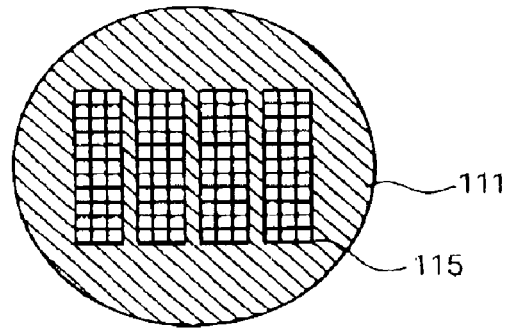

FIG. 6 is a schematic view showing a color filter of the present invention, FIG. 7 is an enlarged view of the region A of FIG. 6, and FIG. 8 is an enlarged view of the region B of the FIG. 7.

As shown in FIG. 6, an active region 101 and a dummy region 200 are defined in a color filter substrate 300, after which a metal layer is deposited all over the surface of the substrate and selectively etched by a photolithographic process so as to form plural black matrixes 111 which are spaced from each other at regular intervals. In FIG. 6, the reference numeral 110 indicates a color filter edge.

Next, a color resin film is applied all over the resulting structure and then selectively etched to form color pixels 112a, 112b and 112c at desired positions in such a manner that they are extended to the black matrix 111. Namely, in forming these color pixels 112a, 112b and 112c that are red, green and blue pixels, one color pixel 112a, 112b or 112c is formed and then other color pixels are successively formed.

At this time, in order to stably pattern the color pixels 112a, 112b and 112c and to ensure a process margin such as rubbing in a cell process, dummy color pixels 112a', 112b' and 112c' are formed.

Thereafter, a protective layer 114 is applied on the resulting structure and planarized, and a photosensitive resin layer 113 for maintaining cell gap is then applied on the protective layer 114. In this case, the photosensitive resin layer 113 is formed of a polymer substance selected from the group consisting of an acrylic polymer, an epoxy-based polymer, an alignment agent and a photoresist.

After this, a half-tone resist is used on the photosensitive resin layer 113 and the photosensitive resin layer 113 is then selectively patterned so as to form a half-tone mask pattern 115 on the dummy color pixels 112a', 112b' and 112c' and to form a mask pattern 116 on the active region. At this time, the half-tone mask pattern 115 may be formed in a square dot shape, a circular dot shape, a horizontal line shape or a vertical line shape, as shown in the alternative embodiments shown in FIG. 9(a)–9(d).

In this case, the half-tone mask pattern serves to partially block light in order to allow the height to be varied while maintaining a constant pattern size. In this half-tone mask pattern region, optical interference and diffraction occur so that an effect of irradiating light of low intensity is obtained. Furthermore, the pattern size and shape, etc., need to be determined in view of a desired height.

The photosensitive resin layer 113 is selectively etched using the half-tone mask pattern 115 and the mask pattern 116 to produce the spacers 113a. Then, the half-tone mask pattern 115 and the mask pattern 116 are removed and a cleaning process is carried out.

In this case, a post density in the region of the post spacers 113a is 1 post spacer/3 pixels, and the shape of the post spacers 113a is a rectangular shape, such as a 15×20 μm size.

Figure 10:
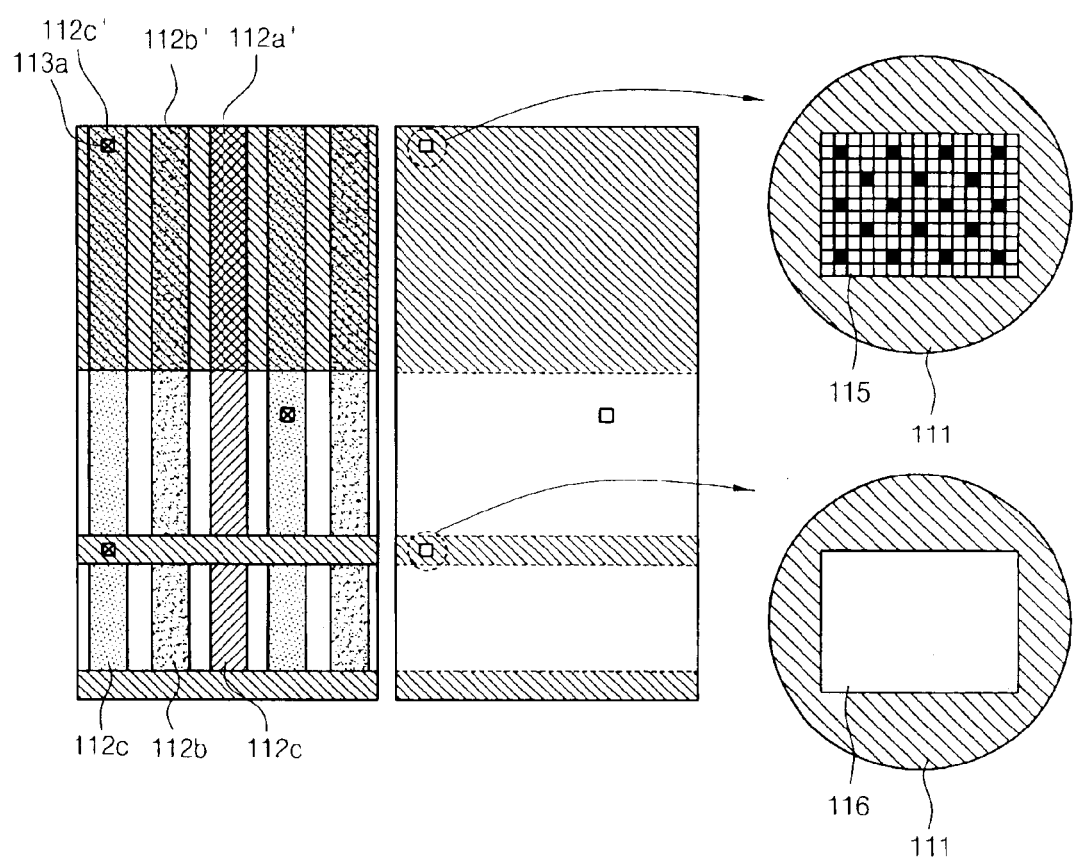
FIG. 10 shows post spacers formed using a half-tone mask according to the present invention.

Meanwhile, as shown in FIG. 10, the half-tone mask is applied on the dummy color pixels 112a', 112b' and 112c' in the black matrix 111 having a wide width, whereas the opened mask 116 is used on the black matrix of a narrow width in the active region.

Thereafter, although not shown in the figures, a common electrode is formed on the resulting structure by a photolithographic process. At this time, the common electrode is formed of ITO.

Figure 11:
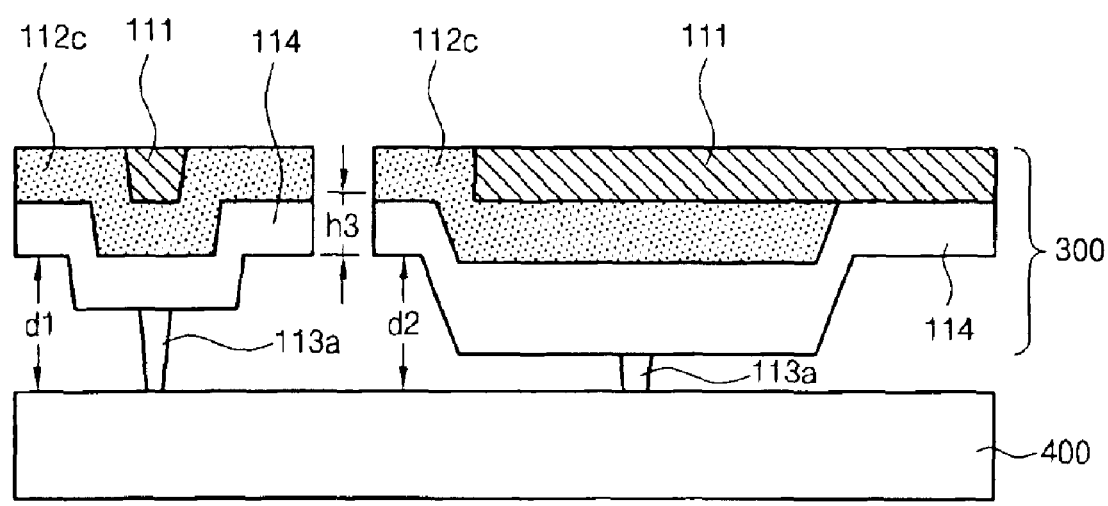
FIG. 11 shows an assembled structure between an array substrate and a color filter substrate having the post spacers formed according to the present invention.

FIG. 11 shows an assembled structure between an array substrate 400 and the color filter substrate 300 having the post spacers formed as described above. In FIG. 11, d1 is cell gap in the active region, and d2 is cell gap in the color pixel resin dummy pattern portion of the black matrix.

As apparent from the foregoing, according to the method for forming the post spacers in the liquid crystal display of the present invention, the uniform cell gap is formed throughout the panel, and hence a liquid crystal display having high quality and uniform luminance characteristics can be fabricated.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for forming post spacers in a liquid crystal display, which comprises the steps of:

forming a black matrix on a substrate having an active region and a dummy region in a substrate;

forming a black matrix on the substrate outside the active region;

selectively forming a RGB resin film on the active region while selectively forming a RGB resin film on the dummy region;

forming a protective film on the resulting structure;

forming a photosensitive resin film on the protective film;

exposing the photosensitive resin film by using a mask with a half-tone mask pattern; and forming post spacers in the active region and dummy region respectively, by developing the exposed photosensitive resin film, wherein the length of the post spacer formed in the dummy region is less than the length of the post spacer formed in the active region.

2. The method of claim 1, in which the shape of the half-tone mask pattern is one selected from the group consisting of a square dot shape, a circular dot shape, a horizontal line shape, and a vertical line shape.

3. The method of claim 1, in which the photosensitive resin film is formed of a polymer substance.

4. The method of claim 3, in which the polymer substance is selected from the group consisting of an acrylic polymer, an epoxy-based polymer, an alignment agent, and a photoresist.

5. The method of claim 1, in which a post density in the post spacer region is 1 post spacer/3 pixels.

6. The method of claim 1, in which the shape of the post spacers is rectangular having a size of 15×20 $\mu$m.

* * * * *